(12) United States Patent
Kratzenberg et al.

(10) Patent No.: US 6,275,201 B1
(45) Date of Patent: Aug. 14, 2001

(54) ADVERTISEMENT SYSTEM FOR AN AIRPORT FACILITY

(75) Inventors: Wolfgang Kratzenberg, Schauenburg; Siegfried Stein, Vellmar, both of (DE)

(73) Assignee: Expresso Deutschland Transportgeräte GmbH, Kassel (DE)

( * ) Notice: Subject to any disclaimer, the term of this patent is extended or adjusted under 35 U.S.C. 154(b) by 0 days.

(21) Appl. No.: 09/211,890

(22) Filed: Dec. 15, 1998

(30) Foreign Application Priority Data

Dec. 18, 1997 (DE) .......................................... 297 22 340 U

(51) Int. Cl.[7] ........................................................ G09G 5/00
(52) U.S. Cl. .................................................. 345/2; 40/606
(58) Field of Search ............................ 40/463, 446, 453, 40/447, 606; 345/1, 89, 2, 56

(56) References Cited

U.S. PATENT DOCUMENTS

| | | | |
|---|---|---|---|
| 3,868,675 | * 2/1975 | Firmin | 345/56 |
| 4,750,151 | * 6/1988 | Baus | 364/900 |
| 4,754,582 | * 7/1988 | Cameron | 52/27 |
| 4,791,417 | * 12/1988 | Bobak | 345/89 |
| 6,088,008 | * 7/2000 | Reeder | 40/447 |

* cited by examiner

Primary Examiner—Amare Mengistu
(74) Attorney, Agent, or Firm—Sidley Austin Brown & Wood, LLP

(57) ABSTRACT

An advertisement system for an airport facility having a plurality of gates connected by passageways and aisles and provided in departure and arrival buildings with restaurants and shops, with information carriers emitting written and picture messages and provided on information boards, and with a plurality of luggage pushcarts for transporting luggage of airport passengers inside the facility, the advertisements system including a plurality of advertisement panels each having a standard advertisement message and at least one different advertisement message stored in the advertisement panels, and elements which arbitrary change the messages so that one of the advertisement messages is displayed at a time.

8 Claims, 4 Drawing Sheets

ADVERTISEMENT SYSTEM FOR AN AIRPORT FACILITY

BACKGROUND OF THE INVENTION

1. Field of the Invention

The present invention relates to an advertisement system for an airport facility having a plurality of gates connected by passageways and aisles and provided in departure and arrival buildings with restaurants and shops, with information carriers emitting written and picture messages and provided on information boards and with a plurality of luggage pushcarts for transporting luggage of airport passengers inside the facility.

2. Description of the Prior Art

With an ever increasing use of airplanes as means of transportation and the accompanying increase in air traffic, the size of airport facilities is also necessarily increases. Therefore, the use of the airport facilities for advertisement purposes evokes greater and greater interest. Therefore, the airport businesses try hard to offer different, interesting advertisement board or panels. However, despite the spaciousness of an airport facility, the surface available for advertising is limited. As a result of the finite nature of the surface in an airport facility available for advertising, there exists a need in a most effective use of the available-for-advertising surface. The present conventional use of the available-for-advertising surface for single messages prevents an increased or multiple use of the limited surface available-for-advertisement.

Accordingly, an object of the present invention is an advertisement system for an airport facility which would permit a multiple use of the available-for-advertising surface, thereby permitting offering of the available-for-advertising surface to different customers and advertisers.

Another object of the present invention is an advertisement system for an airport facility which would permit offering of the available-for-advertisement surface to customers and advertisers at different pricing scales dependent on a selected advertisement message.

SUMMARY OF THE INVENTION

These and other objects of the present invention, which will become apparent hereinafter, are achieved by providing an advertisement system including a plurality of advertisement panels each having a standard advertisement message and at least one different advertisement message stored in the advertisement panels, and means for arbitrary changing the messages so that one of the advertisement messages is displayed at a time. According to the present invention, a controlled turn-on time, which is dependent on an arbitrary number and distribution of airport passengers throughout the airport facility, is associated with turn-on/off advertisement areas available in different areas of the airport facility for advertising. The arbitrary number can be defined by a number of usable luggage pushcarts so that an advertisement space is rented for a price corresponding to an arbitrary number of pushcarts passing through the area. The pushcarts are equipped with a device for activating a predetermined advertisement message on that turn-on/off advertisement area which a pushcart passes. This, on one hand, insures a multiple arbitrary use of advertisement areas of panels and, on the other hand, permits to match the price for an advertisement to payments for rent of a certain number of pushcarts, i.e., to determine the probability of how long a certain advertisement area will be used for a certain advertisement. Thus, the probability of display of an advertisement message increases with the increase of a number of rented pushcarts.

For an advantageous multiple use of the available advertisement areas, in accordance with advantageous development of the present invention, it is further contemplated that an advertisement message is displayed for a limited time, and the switching of the advertisement on and off is effected by using a wireless remote control system, with the advertisement message being activated by a mobile transmitter. This can be effected, in a simplest case, by providing an a pushcart a signal generator, e.g., a magnet which activates a switch-on device associated with a respective advertisement area or panel upon the pushcart passing by. However, this simplest form of activation means permits to activate a very limited number of exchangeable advertisement messages.

Therefore, according to a further embodiment of the present invention, a plurality of interrogatable transponders with means for emitting coded signals are arranged on the luggage pushcarts, with respective transponders being associated with a respective advertisement message. It is further contemplated that a plurality of suitable devices for interrogating of the transponders, i.e., for receiving coded signal emitted therefrom, are associated with the advertisement areas or panels. These devices are formed as transmitter/receiver units. This makes possible to store in separate advertisement areas or panels, an arbitrary number of advertisement messages.

An optimal use of the advertisement areas or panels is increased when a limited display time is assigned to each separate advertisement message. According to the invention, an automatic time limitation of separate advertisement messages is achieved by providing a counter downstream of a respective sender/transmitter unit and which stores the entry of activation signal in case the activation signals are inputted in a quicker sequence then they can be implemented.

In order to prevent that pushcarts, which inadvertently were left within a reach region of an interrogating station, trigger a lasting display of a particular advertisement message, according to a further advantageous embodiment of the present invention, each sender/transmitter device, in addition to the counter, is associated with a timer which, upon an identification of a static activation signal limits a message repetition to a predetermined interval, e.g., to 30 minutes.

Preferably, each advertisement area or panel is programmed with a standing advertisement message which is automatically turned on in case no activation signal for triggering any advertisement message is received.

According to a further development of the present invention, the transmitter/receiver devices are stationary mounted in all of turn-offs and crossings of the passageway and the aisles of the airport facility on a ceiling. Each of the transmitter/receiver units include a transmitter and two receiver antennas mounted on opposite sides of the transmitter in alignment therewith. Each transmitter/receiver unit is so mounted on the ceiling in respective turn-offs and crossings that each receiver antenna is associated with a movement direction of a pushcart.

The present invention contemplates the use, instead of wireless remote control system for controlling the advertisement panels, of a system including a light transmitter and a light receiver.

In accordance with a still further development of the advertisement system with a multiple use of the available advertisement areas by switching time-limited advertisement messages, it is contemplated that the switching signal emitting means, e.g., transponder, can be provided on other items associated with displacement of passengers within an airport facility, e.g., on air tickets.

BRIEF DESCRIPTION OF THE DRAWINGS

The features and objects of the present invention will become more apparent, and the invention itself will be best understood from the following detailed description for the preferred embodiments when read with reference to the accompanying drawings, wherein.

DETAILED DESCRIPTION OF THE PREFERRED EMBODIMENTS

Figure 1:
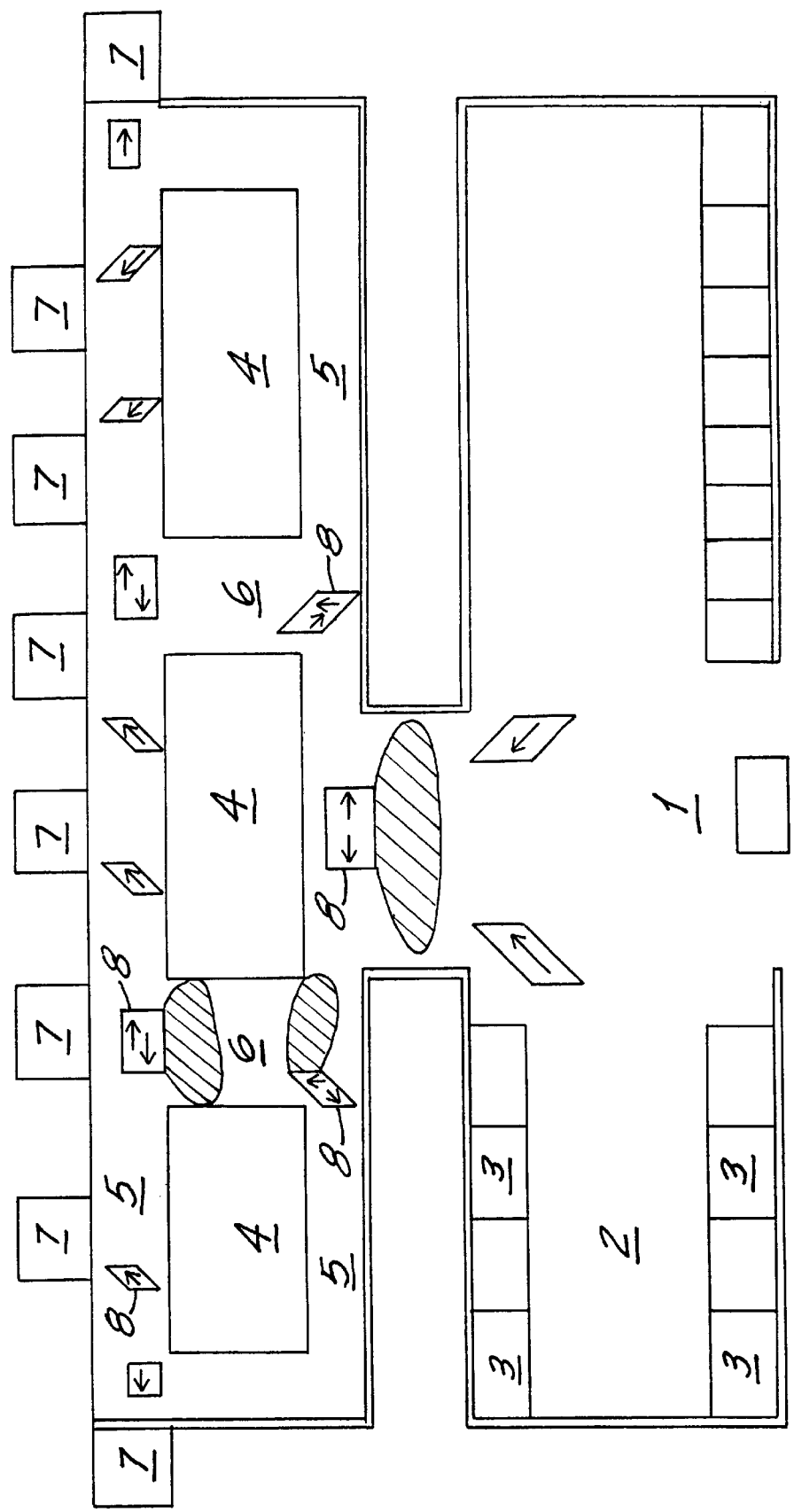
FIG. 1 shows a schematic view of a ground plan of an airport facility.

FIG. 1 shows a simplified schematic view of a ground plan of an airport facility which includes, e.g., a central area 1 in a departure building 2 in which a plurality of check-in desks 3 are provided. A plurality of shops and restaurants 4 are also located in the central area 1. A plurality of gates 7 are provided on the periphery of the central area 1. The gates 7 are connected with the central area 1 and with each other by passageways 5 and aisles 6. Starting from the check-in desks 3 or the central region 1 over the ground plan of the airport facility and in all of the passageways 5 and aisles 6, the advertisement areas are provided. The advertisement areas include display panels 8 which in addition to a standard advertisement, store at least one and, preferably a plurality of different advertisement messages. The advertisement messages are arbitrary changed in such a manner that in an arbitrary order, one of the stored advertisement messages is displayed.

Figure 2:
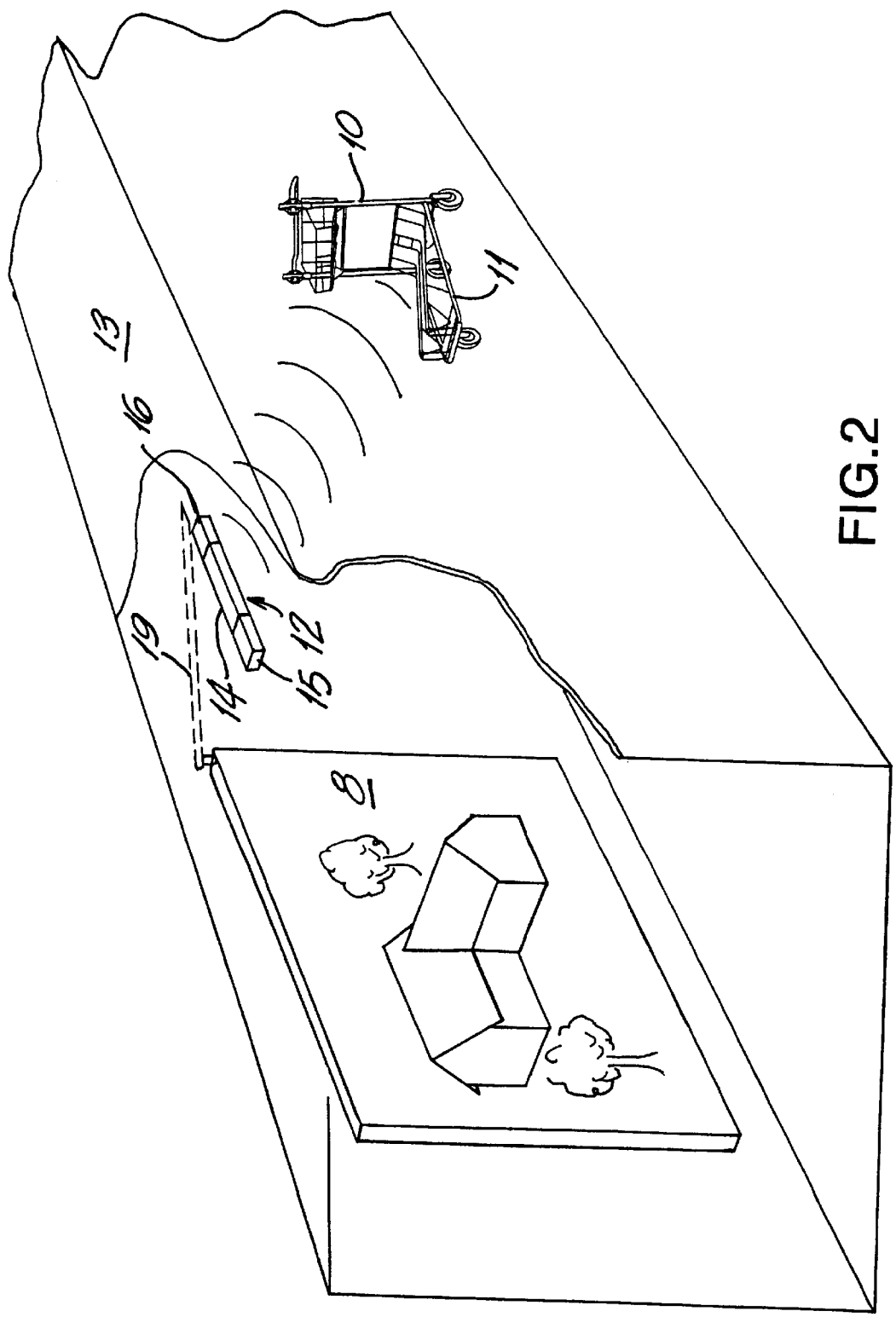
FIG. 2 shows a schematic diagrammatic view of an information board having an advertisement area and an associated therewith transmitter-receiver unit.
Figure 4:
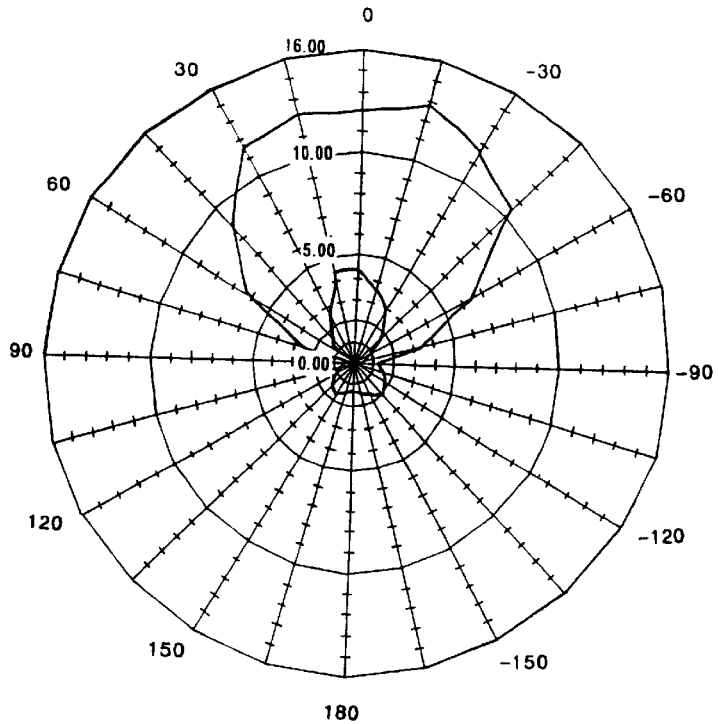
FIG. 4 shows a diagram of a vertical reach of a stationary transmitter-receiver installation.
Figure 5:
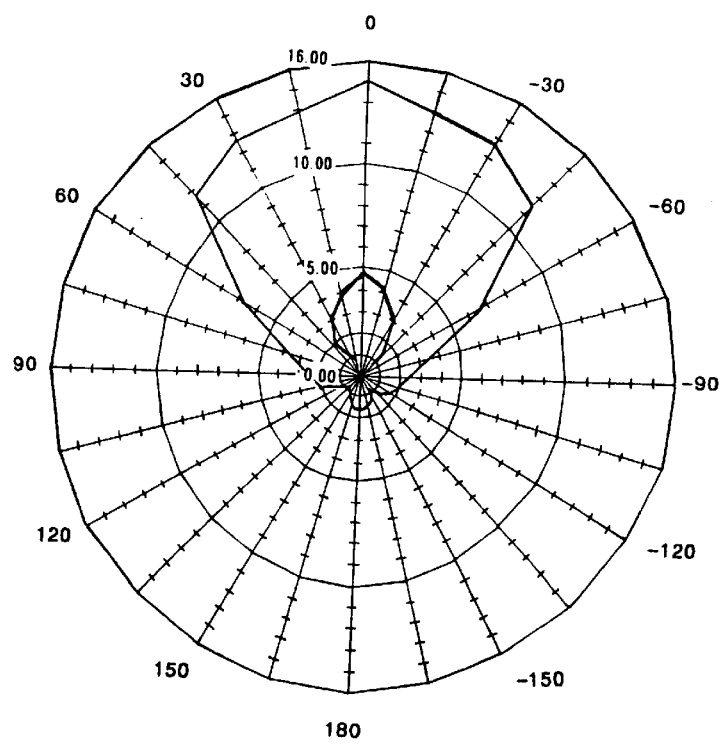
FIG. 5 shows a diagram of a horizontal reach of a stationary transmitter-receiver installation.

The display or exchange of the stored advertisement messages is effected in the embodiment of the advertisement system shown in the drawings by a wireless remote control system. The remote control system includes transponders 11 which are provided in the luggage pushcarts 10 and which serve as special means emitting coding signals in response to an inquiry. The transponders 11 can simply send a single signal for turning on a corresponding advertisement message. In addition to transponders 11 provided on the pushcarts 10, the remote control system includes suitable devices, in particular, transmitter/receiver units 12 which are capable of inquiring and receiving coded dated from a transponder 11. The transmitter/receiver units 12 are associated with respective information boards containing advertisement panels or with pure advertisement boards containing only advertised messages. The transmitter/receiver units 12, which are associated with the information and/or advertisement boards, are connected with the respective information and/or advertisement boards by respective conductor sets 19, are shown in FIG. 2, and are capable of inquiring and receiving coded data from a transponder 11. The transmitter/receiver units 12, which are associated with the information and/or advertisement boards by respective conductor sets 19, as shown in FIG. 2, and are arranged on the walls or ceiling of the building, as shown in FIG. 2. As shown in FIGS. 4 and 5, the transmitter/receiver units 12 have limited vertical and horizontal reach regions which have a somewhat lobar-like shape.

Figure 3:
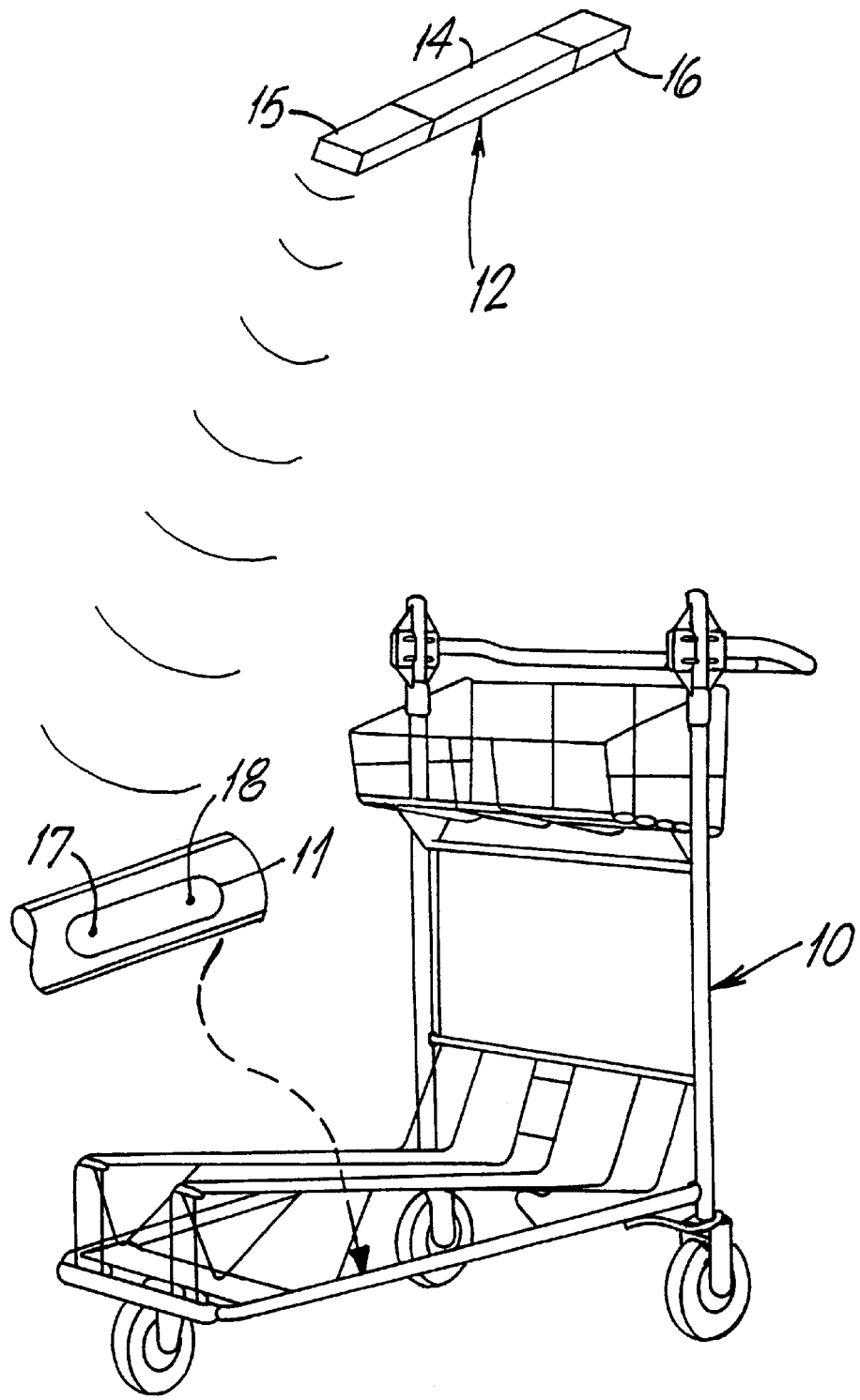
FIG. 3 shows a schematic view of a control arrangement for a pushcart.

As particularly shown in FIG. 3, a stationary transmitter/receiver unit 12 has a single transmitter 14 and two receiving antennas 15, 16 aligned with the transmitter 14 and arranged on opposite sides of the transmitter 14. The transmitter/receiver units 12 are so mounted on the ceiling 13 in the region of the passageways 5 and aisles 6 that each receiving antenna 15 or 16 is associated with a direction of movement of the pushcarts 10. Correspondingly, the transponder 11 is provided with two directed poles 17 and 18. The transponder 11 is arranged on a respective pushcart 10 parallel to a longitudinal axis of the pushcart 10 so that it is aligned in parallel with the transmitter/receiver unit 12.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An advertisement system for an airport facility having a plurality of gates connected by passageways and aisles and provided in departure and arrival buildings with restaurants and shops, with information carriers emitting written and picture messages and provided on information boards, and with a plurality of luggage pushcarts for transporting luggage of airport passengers inside the facility, the advertisement system comprising:

a plurality of advertisement panels each having a standard advertisement message and at least one different advertisement message stored in the advertisement panels; and means for arbitrary changing the message so that one of the advertisement messages is displayed at a time, wherein a controlled turn-on time, which is dependent on an arbitrary number and distribution of airport passengers, is associated with turn-on/off advertisement areas for advertisement panels available in the airport facility, wherein a limited turn-on time is associated with each advertisement message, and wherein the message changing means comprises a plurality of sets of interrogatable transponders with the transponders of each set emitting particularly coded signals, which correspond to a particular message, and arranged on a group of luggage pushcarts of the plurality of a luggage pushcarts available in the airport facility, whereby the particular message is displayed dependent on a frequency the luggage pushcarts of the group of luggage pushcarts passing a particular location.

2. An advertisement system as set forth in claim 1, wherein the message changing means comprises a plurality of sender/transmitter units associated with respective ones of the plurality of advertisement panels and capable of interrogating the transponders.

3. An advertisement system as set forth in claim 2, wherein the message changing means comprises a plurality of counters associated with the plurality of the sender/transmitter units, respectively, for storing an entry of activated signals when the activated signals are inputted in a quicker sequence than they can be implemented.

4. An advertisement system as set forth in claim 3, wherein each sender/transmitter unit is associated, in addition to the counter, with a timer which, upon an identification of a static activation signal for a certain advertisement message, limits a message repetition to a predetermined interval.

5. An advertisement system as set forth in claim 2, wherein the transmitter/receiver devices are stationary mounted in all turn-of and crossings of the passageway and the aisles of the airport facility on a ceiling, and wherein each of the transmitter/receiver comprises a transmitter and two receiver antennas mounted on opposite sides of the transmitter in alignment therewith, each transmitter/receiver unit is so mounted on the ceiling in respective turn-offs and crossings that each receiver antenna is associated with a movement direction of a luggage pushcart.

6. An advertisement system as set forth in claim 1, wherein each advertisement panel is so programmed that a predetermined advertisement message is automatically activated in case of an absence of an activation signal for any of the advertisement messages.

7. An advertisement system as set forth in claim 1, wherein the message changing means comprises a wireless remote control system.

8. An advertisement system as set forth in claim 7, wherein the remote control system comprises a plurality of transmitter/receiver units having their own power source and arranged on luggage pushcarts available in the airport facility for transporting luggage of passages, the plurality of the transmitter/receiver units cooperating with a central transmitter/receiver installation.

* * * * *